Aug. 19, 1924.
H. M. HOWELL
WHEEL
Filed May 21, 1923
1,505,465
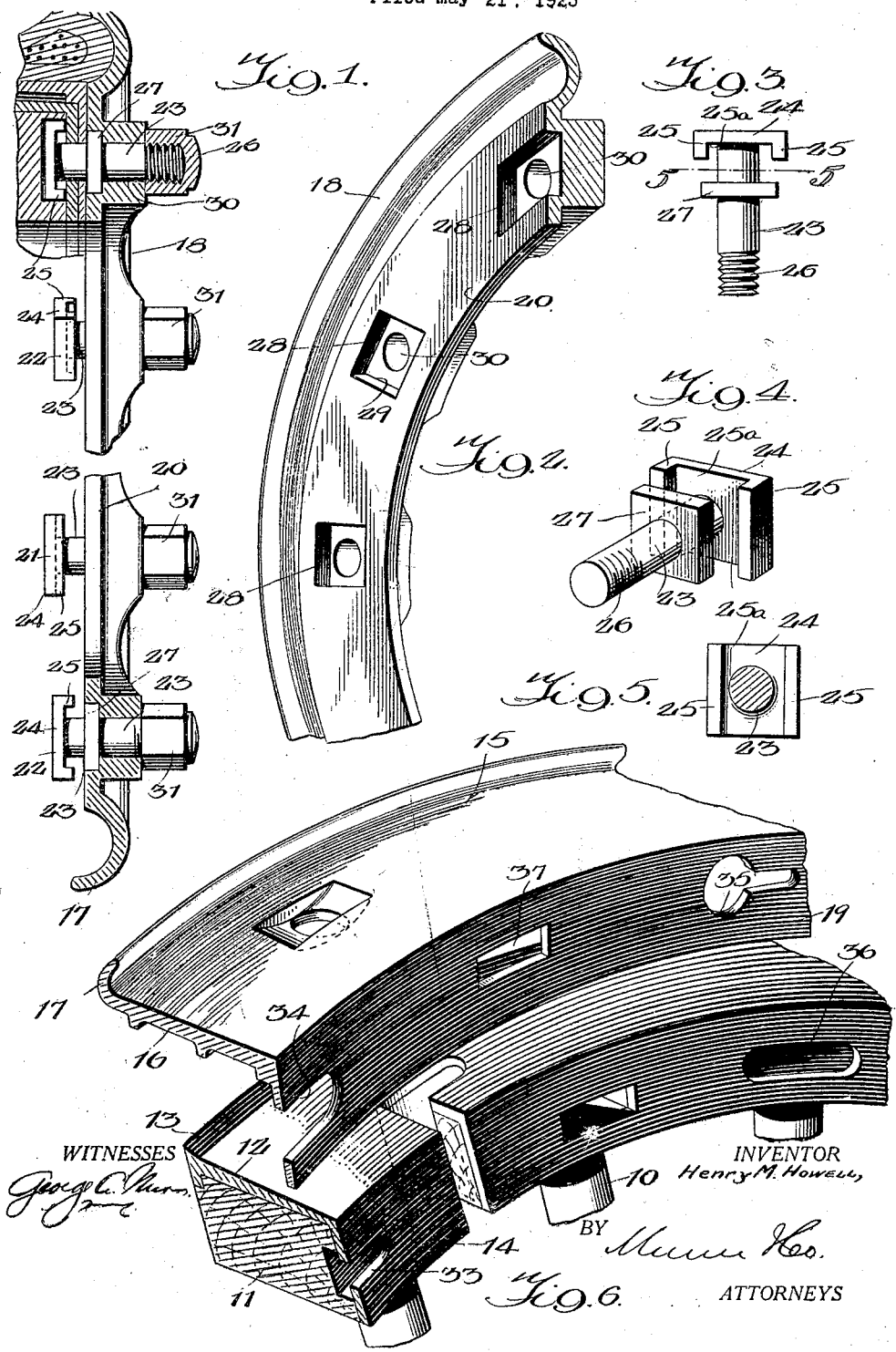

Patented Aug. 19, 1924.

1,505,465

UNITED STATES PATENT OFFICE.

HENRY MARTIN HOWELL, OF MONROE, LOUISIANA, ASSIGNOR OF ONE-HALF TO JOHN EDWARD DOUGHTIE, OF MONROE, LOUISIANA.

WHEEL.

Application filed May 21, 1923. Serial No. 640,400.

*To all whom it may concern:*

Be it known that I, HENRY MARTIN HOWELL, a citizen of the United States, and a resident of Monroe, in the parish of Ouachita and State of Louisiana, have invented certain new and useful Improvements in Wheels, of which the following is a specification.

This invention relates to an improvement in wheels of the type embodying a demountable rim and forming the subject-matter of my co-pending applications filed July 3, 1922, Serial No. 572,497 and filed March 28, 1923, Serial No. 628,372, and more particularly relates to an improvement in the locking arrangement for releasably securing the outer retaining flange to the other elements of the rim and for securing the demountable rim as a whole on the felly or fixed rim of the wheel.

The object of the invention is to provide a locking arrangement of this character which may be readily and easily operated to assemble or disassemble the parts and wherein the liability of the parts being bound by corrosions or being retarded in their movements by excessive friction is avoided.

An important object of the invention resides in the provision of a locking arrangement which is so constructed and organized as to permit of disassembly even though the elements of the locking arrangement or the parts associated therewith should become distorted by reason of severe or excessive shock or strain.

A further object is to provide a device of this character and having the foregoing advantages and which is at the same time of simple and durable construction, reliable in operation and easy and comparatively inexpensive to manufacture and wherein the parts liable to become worn or injured may be replaced or readily repaired.

Other objects and advantages of the invention reside in certain novel features of the construction, combination and arrangement of parts which will be hereinafter more fully described and particularly pointed out in the appended claims, reference being had to the accompanying drawings forming part of this specification, and in which:

Figure 1 is a view, partly in section and partly in elevation, showing a portion of the outer retaining flange equipped with the locking device embodying the present invention;

Figure 2 is a fragmentary perspective view of the outer tire retaining flange but showing the locking studs removed;

Figure 3 is a detail view in elevation of one of the locking studs;

Figure 4 is a perspective view thereof;

Figure 5 is a view in section on line 5—5 of Figure 3;

Figure 6 is a fragmentary view in perspective, showing portions of the demountable rim structure and wheel structure with which the removable retaining flange and locking device shown in Figures 1 to 5 inclusive coact.

It is to be understood that the invention herein shown and described is intended for use with the demountable rim and wheel structure forming the subject-matter of my co-pending applications herein-above referred to and reference is had to these applications for full illustration of said rim and wheel construction.

Referring to the drawings, and more especially to Figure 5, the numeral 10 designates generally a portion of the wheel which may be of any conventional type. The wheel includes a felly 11 upon which the felly band or fixed rim 12 is shrunk or otherwise suitably secured, the felly band having a circumferential shoulder 13 constituting a seat for the demountable rim and having an integral locking plate 14 at its outer circumferential edge which locking plate depends from the felly band and is disposed flush up against the outer lateral face of the felly 11. The felly 11 is slightly reduced in width so that the thickness of the locking plate complements the width or thickness of the felly to provide the complete felly of standard dimensions.

A demountable rim, designated generally at 15 is provided and includes a base section 16, an inner tire retaining flange 17 and an outer removable tire retaining flange 18 (see Figures 1 and 2). The base section 16 of the demountable rim is provided around its outer circumferential edge with an integral depending locking plate 19 adapted to lie flush up against the locking plate 14 in assembly and similarly the outer retaining flange 18 includes an integral locking plate 20 adapted to lie flush up against the locking plate 19 in the assembly. The locking plate 20 carries a plurality, preferably four, long studs designated generally at 21 and a plurality, preferably four, short studs, designated generally at 22.

These locking studs are of special design and construction and are organized with the locking plate 20 of the outer tire retaining flange 18 in the novel relation now to be described. As the construction, arrangement and relation of the long and short studs are identical, these studs differing from each other only in length, a common description will serve for all. Each stud includes a shank 23 having at one end a head 24 provided with a pair of marginal ribs 25. The opposite end of the shank from that which carries the head 24 is threaded, as at 26, and intermediate its ends the shank has rigidly formed thereon a shoulder 27 which is polygonal in formation and preferably square.

The locking plate 20 with which the studs 21 and 22 are associated is provided with a number of sockets, designated generally at 28, one for each stud. Each socket 28 includes a seat 29 of polygonal formation and preferably square and in which the shoulder 27 of the stud is received and snugly fitted in assembly. These sockets 28 also include rounded openings 30 which communicate with the seats 29 and extend entirely through the plate. As clearly shown in Figure 1, the studs in assembly have their shanks 23 extending through the socket 28 with the squared shoulder 27 snugly fitted in the squared seats 29 and rounded portions of the shank 23 snugly fitted in the openings 30. The threaded portions 26 of the shanks 23 project beyond the outer face of the locking plate and on these threaded portions blind nuts or cap nuts 31 are threaded and coact with the locking plate to securely hold the studs against endwise movement. Of course rotative movement of the studs is prevented by virtue of the engagement of the shoulder 27 with the walls of its seat 29. The long studs 21 coact with key hole slots 33 provided in the plate 14, the plate 19 being provided with slots 34 permitting of the passage of the studs 21 into the slots 23. The short studs 22 coact with key hole slots 35 provided in the locking plate 19, the heads of the studs 22 being accommodated in slots 36 provided for such purpose in the locking plate 14. By this arrangement the general and broad features of which, as previously noted, are fully set forth and form the subject-matter of my co-pending application herein-above referred to and to which reference is had for full illustration of these features, the outer tire retaining flange 18 may be securely locked to the other elements of the demountable rim and the demountable rim as a whole may be locked on the wheel, this locking arrangement being entirely complete and secure as against all except circumferential movement in one direction. For the purpose of preventing such circumferential movement any suitable means may be employed but preferably a locking arrangement of the type shown and described and claimed in my application filed March 29, 1923, Serial No. 628,673 is utilized and embodies a wedge bar mounted in the felly and extended through openings in the plates of the fixed rim and the demountable rim. Certain of said openings are designated at 37 in Figure 5.

It is to be understood at this point that the locking plate 20 of the outer tire retaining flange may be cut away in between portions thereof in which the sockets 28 are formed or may be made of uniform cross section throughout its extent as desired. Again it is to be noted that the projecting portions of the shanks of the studs and the cap nuts that encompass them afford convenient means for manipulating the tire retaining flange through its movements, these elements being adapted for coaction with a wrench or being adapted to serve as impact lugs.

It is to be noted that by virtue of the manner of constructing and mounting the locking studs on the outer tire retaining flange that disassembly of the parts may be readily carried out even though the elements of the rim have been distorted by a severe shock or strain. Such disassembly may be carried out by rotating the cap nuts or blind nuts to disengage them from the threaded portions 26 of the shanks 23 of the studs whereupon the removable tire retaining flange may be taken from the wheel assembly leaving the studs engaged therewith and to be individually removed. Again any stud which has become worn or distorted may be readily replaced or repaired. Moreover a secure and reliable action is had for the studs are held against turning by the coaction of the shoulders 27 with the seats 29 and they are held against endwise movement by the cap nuts 31 which may be also pinned or otherwise additionally secured to the shanks of the studs if found desirable. Another advantage resides in the construction of the head of the studs. These heads are formed with the ribs 25 which engage with the portions of the plates 14 and 19 with which these studs coact. This arrangement provides clearance 25$^a$ and serves a double purpose for preventing or reducing the tendency of corrosion and avoiding excessive frictional engagement between the heads and the parts with which they coact.

I claim:

1. A locking device for securing the removable tire retaining flange to a demountable rim and for securing the demountable rim on the wheel and comprising locking plates carried by the wheel, demountable rim and flange respectively, the locking plates of the demountable rim and flange having key hole slots and a series of long and short studs carried by the locking plate of the retaining flange and cooperable with the key hole slots, the plates of the wheel and demountable rim also having other slots accommodating the studs, each of said studs including a shank, the locking plate of the retaining flange having a socket in which said shank is fitted and beyond which it projects, coacting means between the shanks and locking plate of the outer tire retaining flange preventing relative rotary movement between the shank and the flange, and a cap nut threaded on the outer end of each shank.

2. A locking device for securing the removable tire retaining flange to a demountable rim and for securing the demountable rim on the wheel and comprising locking plates carried by the wheel, demountable rim and flange respectively, the locking plates of the demountable rim and flange having key hole slots and a series of long and short studs carried by the locking plate of the retaining flange and cooperable with the key hole slots, the plates of the wheel and demountable rim also having other slots accommodating the studs, each of said studs including a shank, the locking plate of the retaining flange having a socket in which said shank is fitted and beyond which it projects, coacting means between the shanks and locking plate of the outer tire retaining flange preventing relative rotary movement between the shank and the flange, and a cap nut threaded on the outer end of each shank, the head of each shank being provided with marginal ribs.

3. In a device of the character described, a tire retaining flange and a series of locking studs, each of said locking studs comprising a shank having a head at one end and having its opposite end threaded and having a squared shoulder intermediate its ends, the retaining flange having a socket provided with a squared seat receiving the squared shoulder, the threaded portion of the shank projecting through the socket and beyond the outer face of the tire retaining flange, and a cap nut threaded on the projecting portion of each of said studs.

4. In a locking arrangement of the character described, a tire retaining flange having a series of locking studs provided with heads having marginal ribs.

5. In a locking arrangement of the character described, a tire retaining flange having a series of locking studs, means for mounting the locking studs on the flange including removable cap nuts engageable with the studs and disposed on the outer face of the flange.

HENRY MARTIN HOWELL.